(12) United States Patent
Castillo

(10) Patent No.: US 10,040,156 B2
(45) Date of Patent: Aug. 7, 2018

(54) DISPOSABLE DRILL DEBRIS ELIMINATOR

(71) Applicant: James Anzai Castillo, Honolulu, HI (US)

(72) Inventor: James Anzai Castillo, Honolulu, HI (US)

(73) Assignee: James Anzai Castillo, Honolulu, HI (US)

( * ) Notice: Subject to any disclaimer, the term of this patent is extended or adjusted under 35 U.S.C. 154(b) by 0 days.

(21) Appl. No.: 14/999,980

(22) Filed: Jul. 22, 2016

(65) Prior Publication Data
US 2018/0021906 A1  Jan. 25, 2018

(51) Int. Cl.
*B23B 47/34* (2006.01)
*B23Q 11/00* (2006.01)

(52) U.S. Cl.
CPC .......... *B23Q 11/0071* (2013.01); *B23B 47/34* (2013.01); *B23B 2270/30* (2013.01); *Y10T 408/50* (2015.01)

(58) Field of Classification Search
CPC ............ B23Q 11/0071; B23Q 11/0053; B23B 2270/30; B23B 47/34; Y10T 408/50
See application file for complete search history.

(56) References Cited

U.S. PATENT DOCUMENTS

| | | | | |
|---|---|---|---|---|
| 4,527,449 A | * | 7/1985 | Sydlowski | B23B 31/005 408/16 |
| 4,904,130 A | * | 2/1990 | Gorman | B23B 49/005 408/116 |
| 5,911,324 A | * | 6/1999 | Hammer | B23Q 11/0053 206/460 |
| 5,915,839 A | * | 6/1999 | Dennis | B65D 33/14 383/11 |

FOREIGN PATENT DOCUMENTS

| | | | | |
|---|---|---|---|---|
| DE | 29601940 U1 | * | 4/1996 | ......... B23Q 11/0053 |
| DE | 19719484 A1 | * | 11/1998 | ......... B23Q 11/0053 |
| DE | 19750772 A1 | * | 5/1999 | ......... A61C 8/0089 |
| DE | 29920353 U1 | * | 3/2000 | ......... B23Q 11/0053 |
| DE | 202010011574 U1 | * | 2/2011 | ......... B21C 51/005 |

(Continued)

OTHER PUBLICATIONS

EPO machine translation of DE 29920353, printed Jun. 2017.*
EPO machine translation of DE 29601940, printed Jun. 2017.*
EPO machine translation of DE 19719484, printed Jun. 2017.*

*Primary Examiner* — Daniel Howell

(57) ABSTRACT

An apparatus for the collection, gathering, and disposal of the debris that is created when drilling a hole into a vertical surface. The 'Disposable Drill Debris Eliminator' (DDDE) is designed and constructed in a very simple manner and is thus very inexpensive to manufacturer; the DDDE is designed and constructed so that it is foldable, stackable, and thus very compact; the DDDE it is disposable; the DDDE contains in its design, a method of alignment, which enables the user to align the drill more easily to the intended hole position in a more perpendicular manner; the DDDE contains in it's design and construction, a device that enables the user to control the depth of the hole being drilled; and the DDDE is re-positionable for many uses because the adhesive strength is of the strength of re-positionable sticker notes.

3 Claims, 6 Drawing Sheets

(56) References Cited

FOREIGN PATENT DOCUMENTS

| FR | 2705599 | A1 | * | 12/1994 | ......... | B23Q 11/0053 |
| GB | 2274706 | A | * | 8/1994 | ......... | B23Q 11/0053 |
| GB | 2341334 | A | * | 3/2000 | ......... | B23Q 11/0053 |
| GB | 2364375 | A | * | 1/2002 | ......... | B23Q 11/0053 |
| GB | 2365411 | A | * | 2/2002 | ......... | B23Q 11/0053 |
| GB | 2383965 | A | * | 7/2003 | ......... | B23Q 11/0053 |

* cited by examiner

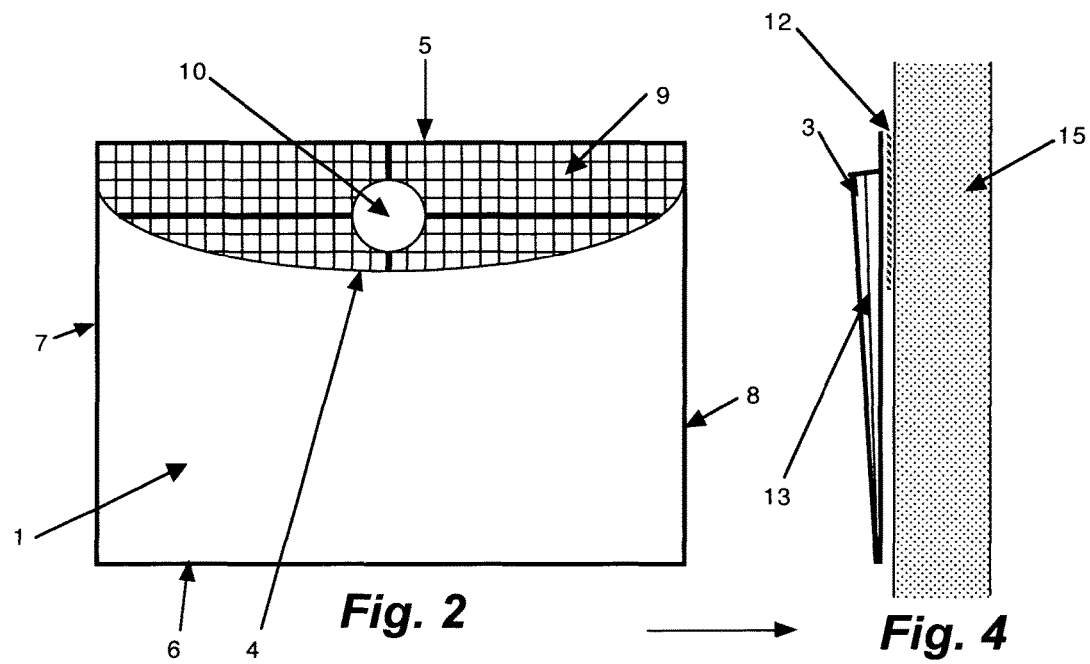
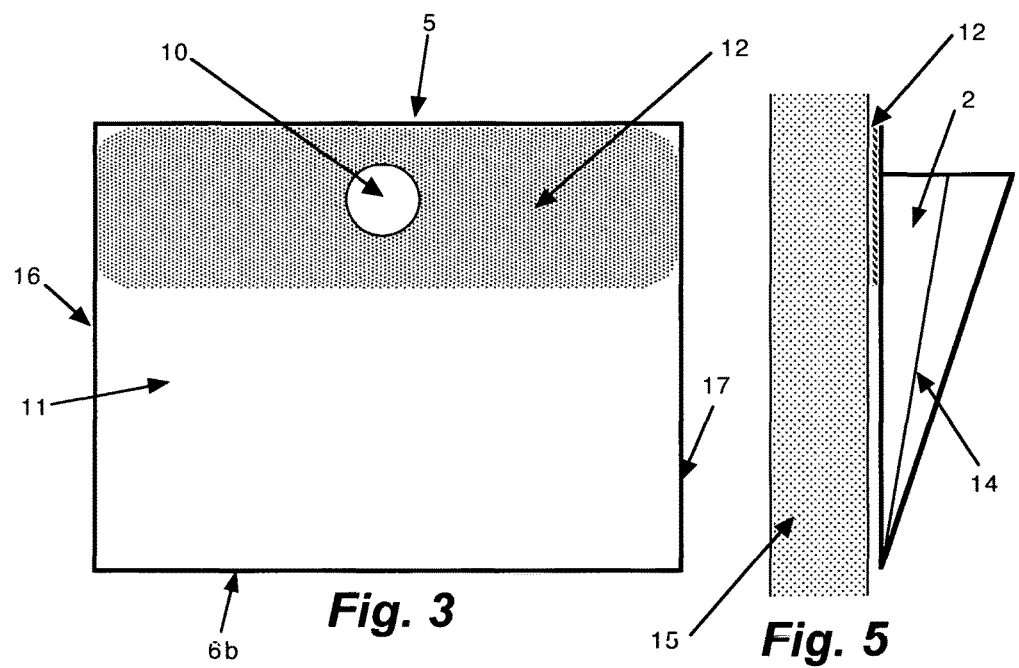

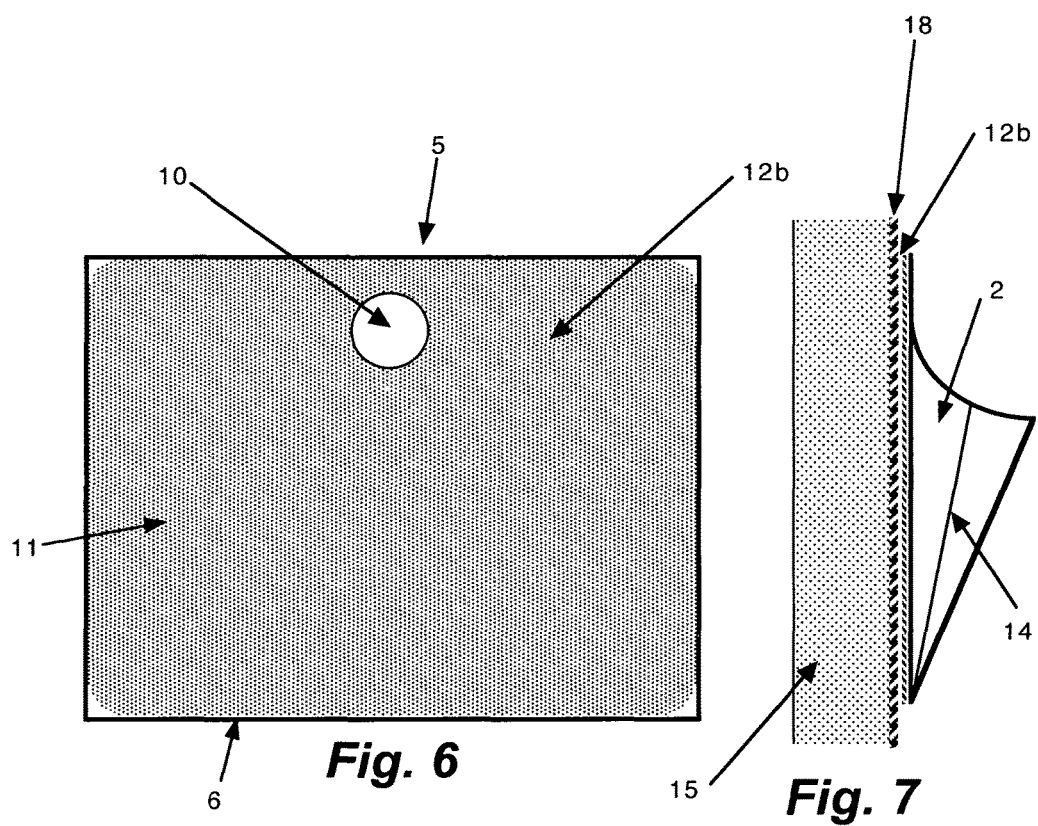

DISPOSABLE DRILL DEBRIS ELIMINATOR

REFERENCES CITED (U.S. PATENT DOCUMENTS)

| | | | |
|---|---|---|---|
| 3,561,670 | February 1969 | Segal | 229/53 |
| 3,936,213 | February 1976 | Kappel | 408/67 |
| 3,946,818 | May 1976 | Klas | 175/209 |
| 5,419,663 | May 1995 | Psomas | 408/67 |
| 5,911,324 | June 1999 | Hammer | 206/527 |
| 5,915,839 | June 1999 | Dennis | 383/11 |
| 6,053,674 | April 2000 | Thompson | 408/67 |
| 6,102,631 | August 2000 | Nyari | 408/67 |
| 6,997,653 B2 | February 2006 | Styles | 408/67 |
| D575,3115 | August 2008 | Koneeny | D15/138 |
| 8,113,747 B2 | February 2012 | Miyanaga | 408/67 |
| D695,584 S | December 2013 | Chen | D8/70 |
| 9,022,702 B2 | May 2015 | Kasuya | B23Q 11/0046 |
| 9,073,161 B2 | July 2015 | Tseng | B23Q 11/0053 |
| 9,304,223 B2 | April 2016 | DeMaira | G01V 3/08 |

BACKGROUND OF THE INVENTION

1. Field of the Invention

The present invention relates to drilling accessories for the collection and gathering of debris that is created when drilling a hole into a vertical surface, more particularly pertains to a new debris collection and gathering apparatus a) that is of a simple and inexpensive construction, b) that is foldable, compact, and stackable, c) that is disposable, d) that contains in its design, a method of alignment, which enables the user to align the drill more easily to the intended hole position in a more perpendicular manner, and e) that contains in it's construction, a device to control the depth of the hole being drilled, and f) that is re-usable for many applications.

2. Description of the Prior Art

The use of drilling accessories for the collection and gathering of debris that is created when drilling a hole into a surface if known in prior art.

Known prior art includes,

U.S. Pat. No. 3,561,670, U.S. Pat. No. 3,936,213, U.S. Pat. No. 3,946,818, U.S. Pat. No. 5,419,663, U.S. Pat. No. 5,911,324, U.S. Pat. No. 5,915,839, U.S. Pat. No. 6,053,674, U.S. Pat. No. 6,102,631, U.S. Pat. No. 6,997,653 B2, U.S. Pat. No. D575,311 S, U.S. Pat. No. 8,113,747 B2, U.S. Pat. No. D695,584 S, U.S. Pat. No. 9,022,702 B2, U.S. Pat. No. 9,073,161 B2, and U.S. Pat. No. 9,304,223 B2.

3. Disadvantages Inherent in the Aforementioned U.S. Patents

While these aforementioned devices fulfill their respective, particular objectives and requirements, the aforementioned patents do not disclose a new debris collections and gathering apparatus. The aforementioned devices have their disadvantages and shortcomings as follows:

The devices detailed in the following patents must be either hand held and/or requires a suction source.

| | | | |
|---|---|---|---|
| U.S. Pat. No. 3,946,818 | May 1976 | Klas | 175/209 |
| U.S. Pat. No. 6,053,674 | April 2000 | Thompson | 408/67 |
| U.S. Pat. No. 8,113,747 B2 | February 2012 | Miyanaga | 408/67 |

The devices detailed in the following patents do not incorporated an adhesive that is easily removed re-usable again.

| | | | |
|---|---|---|---|
| U.S. Pat. No. 3,561,670 | February 1969 | Segal | 229/53 |
| U.S. Pat. No. 5,911,324 | June 1999 | Hammer | 206/527 |
| U.S. Pat. No. 5,915,839 | June 1999 | Dennis | 383/11 |

The devices detailed in the following patents do not allow for a direct visual sight to the actual drill penetration point because the structure gets in the way of direct sight. Also because these devices require the drill bit to penetrate through the device, there is a possibility of the device getting caught in the rotating drill bit.

| | | | |
|---|---|---|---|
| U.S. Pat. No. 3,939,213 | February 1976 | Kapple | 408/67 |
| U.S. Pat. No. 5,419,663 | May 1995 | Psomas | 408/67 |
| U.S. Pat. No. 6,997,653 B2 | February 2006 | Styles | 408/67 |
| U.S. Pat No. D575,311 S | August 2008 | Koneeny | D15/138 |
| U.S. Pat No. D695,584 S | December 2013 | Chen | D8/70 |

The devices detailed in the following patents attach to the drill and covers the entire drill bit and thus the actual drill penetration point is not visible thus sacrificing accuracy.

| | | | |
|---|---|---|---|
| U.S. Pat. No. 9,022,702 B2 | May 2015 | Kasuya | B23Q 11/0046 |
| U.S. Pat. No. 9,073,161 B2 | July 2015 | Tseng | B23Q 11/0053 |
| U.S. Pat. No. 6,102,631 | August 2000 | Nyari | 408/67 |

The device detailed in the following patent requires a battery to operate the suction mechanism, complex in design, and thus results in a high manufacturing cost.

| | | | |
|---|---|---|---|
| 9,304,223 B2 | April 2016 | DeMaira | G01V 3/08 |

In these respects, the new debris collection and gathering apparatus according to the present invention substantially departs from the conventional concepts and designs of the prior art, and in so doing provides an apparatus primarily designed and developed for the purpose of temporarily adhering to a generally vertical surface of a structure to catch debris falling for a drill drilling a hole in the surface of the structure.

BRIEF SUMMARY OF THE INVENTION

In view of the foregoing disadvantages inherent in the known types of drill debris collection apparatuses now present in the prior art, the present invention provides a a new debris collection, gathering, and disposable apparatus primarily designed and developed for the collecting, gathering, and disposing of the debris created from the drilling of a hole into a vertical surface, by a power or hand drill.

This invention, the "Disposable Drill Debris Eliminator", departs and overcomes the disadvantages inherent in the prior inventions as follows:

a) it is designed and constructed in a very simple manner and is thus very inexpensive to manufacturer, b) it is designed and constructed so that it is foldable, compact, and stackable, c) it is disposable, d) it contains in its design, a method of alignment, which enables the user to align the drill more easily to the intended hole position in a more perpendicular manner, e) it contains in its design and construction, a device, when detached from the "Disposable Drill Debris Eliminator" and attached to the drill bit, allows the user to control the depth of the hole being drilled, and f) it is re-usable for many applications, as in most cases of a home DIY project, the drilling of many holes on one occasion/project is more frequent and necessary.

BRIEF DESCRIPTION OF THE DRAWINGS

FIG. 2 is a frontal view of the present invention.

FIG. 3 is a view of the back of the present invention, showing an adhesive area to the top of the embodiment.

FIG. 4 is a right side view of the present invention, with the 'Disposable Drill Debris Eliminator in the "closed" position, before use.

FIG. 5 is a left side view of the present invention, with the 'Disposable Drill Debris Eliminator' in the "open" position, ready for use.

FIG. 6 is a view of the back of the present invention, showing another embodiment of the invention with a larger adhesive area.

FIG. 7 is a side view of FIG. 6 showing adhesion to a rough and uneven surface with the larger adhesion area.

DETAILED DESCRIPTION OF THE INVENTION

It is the intention of this invention to overcome the shortcomings and disadvantages of prior inventions that relate to drilling accessories for the collection, gathering, and disposal of debris that is created when drilling a hole into a vertical surface.

Figure 1:
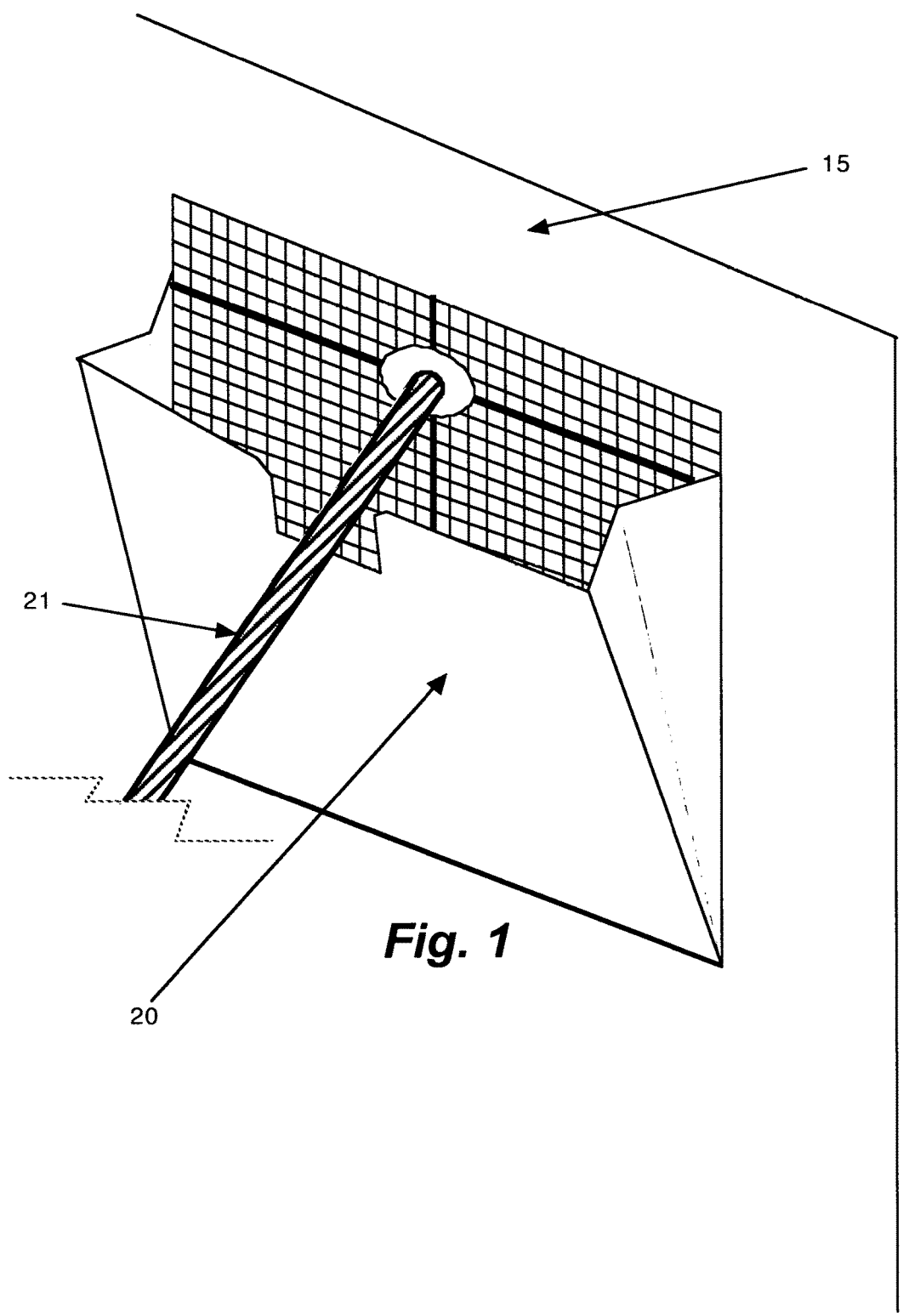
FIG. 1 is a perspective view of the 'Disposable Drill Debris Eliminator' according to the present invention.

The Disposable Drill Debris Eliminator 20 in FIG. 1, is in the 'open' position and is adhered to the vertical surface 15, with a drill bit of a power drill 21 in position for drilling into the vertical surface 15. This is the basic concept of this invention.

The Front Side of the Disposable Drill Debris Eliminator is depicted in FIG. 2 where 1 is the front panel, 4 is the top "concave" edge of the front panel, (this "concave edge" serves to collect drill debris that spreads and scatters both horizontally towards the inside of the left side panel 7 and horizontally towards the inside of the right side panel 8 when drilling.) (This feature is novelty A of this invention.) 5 is the top edge of the back panel, 6 is the bottom edge of the front panel, 7 is the left side edge of the front panel, 8 is the right side edge of the front panel, 10 is the hole of the back panel where drilling is to be performed, 9 is the front face of the back panel. The front face 9 of the back panel 11 of FIG. 3, is cross-hatched for the purpose of easier positioning of the drill to the spot to be drilled, and for easier perpendicular alignment of the drill to the vertical surface when drilling. (This feature is novelty B of this invention.)

The Back side of the Disposable Drill Debris Eliminator is depicted in FIG. 3, where 11 is the back face of the back panel, 5 is the top edge of the back panel, 6b is the bottom edge of the back panel. (It is possible to construct the entire 'Disposable Drill Debris Eliminator' with one piece of material, in this case, the bottom edge of the front panel 6 and bottom edge of the back panel 6b, will be the same part of the same embodiment), (This advantageous 'one-piece' design is novelty C of this invention, and is a feature that lowers production costs.) 16 is the right edge of the back panel, 17 is the left edge of the back panel, 10 is the hole of the back panel (viewed from the back) where drilling is to be performed, and 12 represents the adhesive portion where the Disposal Drill Debris Eliminator adheres to the vertical surface where drilling is to take place. Usually when taking on a DIY project, typically more than one hole is needed to complete the project thus the type and strength of the adhesive used is much like that of a 'sticky note', allowing the Disposable Drill Debris Eliminator to be removed after the drilling of one hole and moved to a new position, over and over again, for as long as the adhesion is usable, or it may be saved and used again on a different occasion. (This type of re-usable adhesive is novelty D of this invention.)

The right side of the Disposable Drill Debris Eliminator is depicted in FIG. 4. The Disposable Drill Debris Eliminator in this drawing is in the 'closed' position, before use, and is adhered by adhesive 12 to a vertical surface 15 where drilling is to be performed. This view depicts the Disposable Drill Debris Eliminator in the 'closed' (flattened) position with the right side panel 3 shown in the folded 'closed' (packaged) position, and 13 is the crease that represents the fold on the right side panel 3 before the Disposable Drill Debris Eliminator is opened for use. When the Disposable Drill Debris Eliminator is packaged in this manner for sale and distribution, many Disposable Drill Debris Eliminators can be stacked on top of each other in the 'un-opened' and 'folded' state. Because the adhesion strengths of the adhesive is much like that of a 'sticky note', the Disposable Drill Debris Eliminators that are stacked on top of each other remain stacked, and can be removed easily one by one, when they are needed for use. This feature further lowers price points to the consumer because the packaging is more compact, resulting in lower distribution and storage costs. (This feature is novelty E of this invention)

The left side of the Disposable Drill Debris Eliminator (ready for use, in the 'open' position) is depicted in FIG. 5 when adhered by adhesive 12 to a vertical surface 15 where drilling is to be performed. This view depicts the Disposable Drill Debris Eliminator in the 'open' position where the left side panel 2 is in the unfolded 'open' position, and 14 is the crease that represents the fold on the left side panel 2 before the Disposable Drill Debris Eliminator was opened for use.

Another embodiment of the Disposable Drill Debris Eliminator showing the adhesive portion/area 12b, covering a larger area of the back side of the back panel 11, is depicted in FIG. 6 and FIG. 7. This embodiment with a larger area of adhesion, allows for a stronger adhesion to an uneven or a rough surface 18, where a stronger adhesion is more favorable. (This variable adhesion level feature is novelty F of this invention.)

Figure 8:
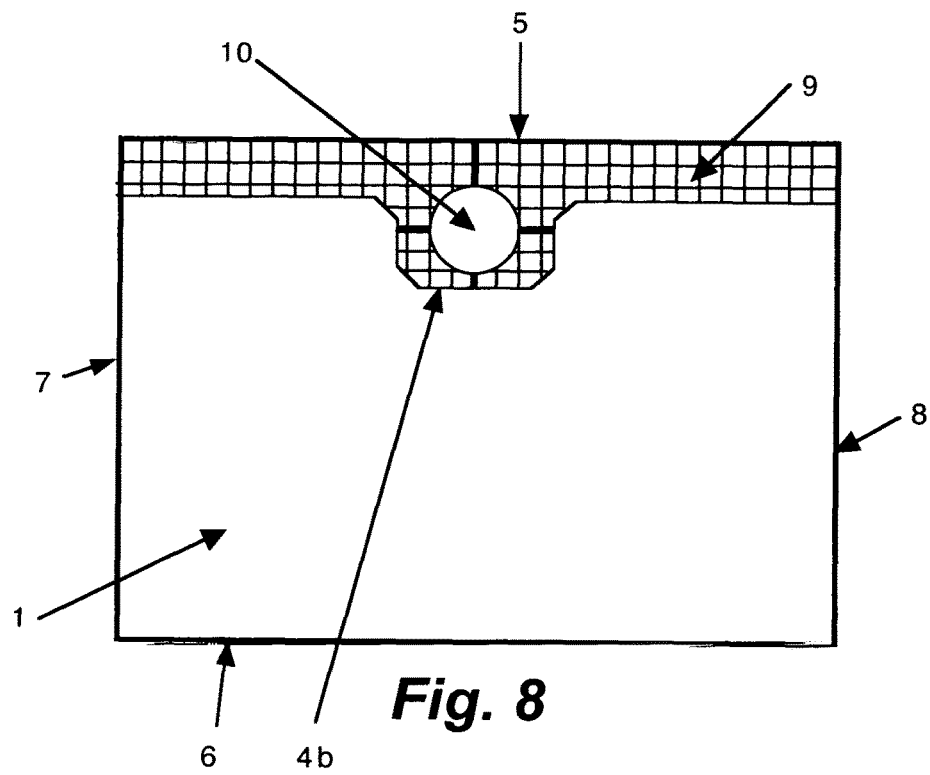
FIG. 8 is a frontal view of yet another embodiment of the invention, depicting a "U" shaped top lip of the front surface.
Figure 9:
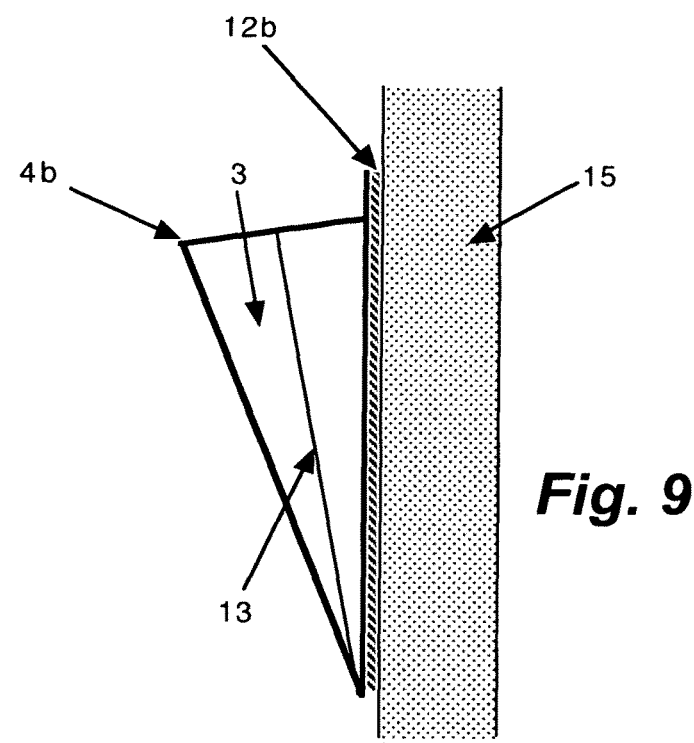
FIG. 9 is the side view of FIG. 8

Yet another embodiment of the Disposable Drill Debris Eliminator showing a "U" shaped edge opening 4b on the top of front panel 1, is depicted in FIG. 8 and FIG. 9. This "U" shaped edge opening serves to collect more drill debris that is spread and scattered both horizontally towards the inside of the left side panel 7 and horizontally towards the inside of the right side panel 8 when drilling. (This feature of variable opening edges 4 and 4b for the front panel 1 is another variation of novelty A of this invention.)

Figure 10:
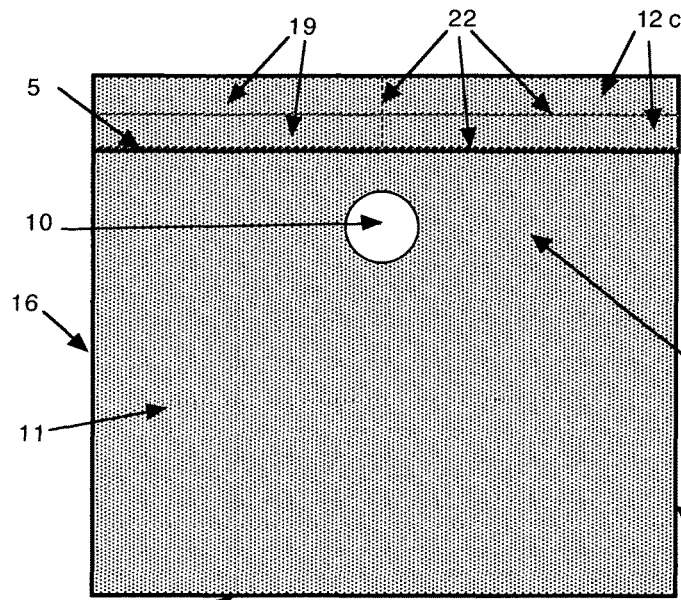
FIG. 10 is a back view of yet another embodiment of the 'Disposable Drill Debris Eliminator depicting a novel structure, the "Perforated Adhesive Drill Depth Indicator" on the top portion of the back panel.
Figure 11:
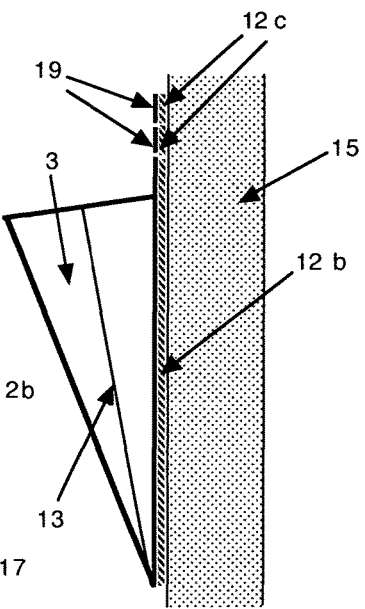
FIG. 11 is the side view of FIG. 10.
Figure 12:
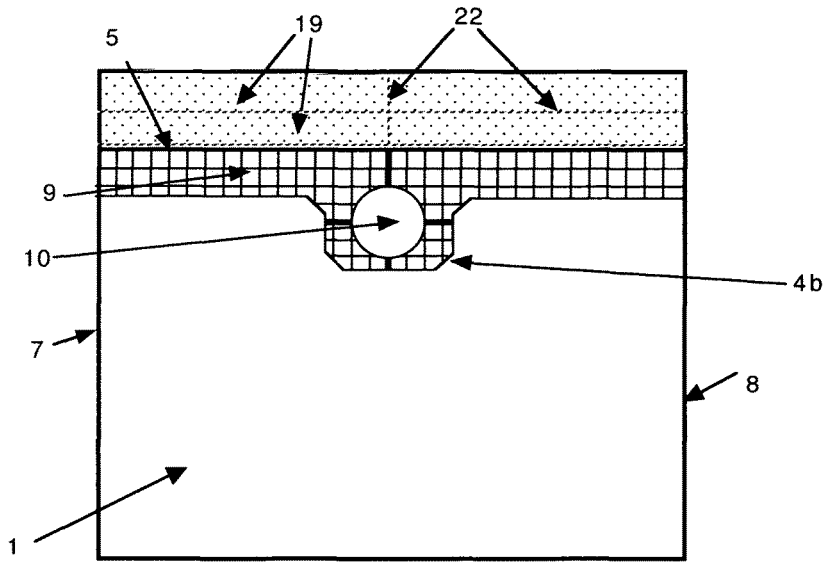
FIG. 12 is the frontal view of FIG. 10

FIG. 10, FIG. 11, and FIG. 12 represents yet another embodiment of the Disposable Drill Debris Eliminator with "Perforated Adhesive Drill Depth Indicators" (PADDI) 19, constructed as an integral part of the back panel 11 above the top edge 5 of the back panel 11, with adhesives 12c on the back side of each PADDI. (FIG. 10, FIG. 11, and FIG. 12 depicts only one scenario where 4 PADDI's are part of the entire embodiment, however any number of PADDI's of various lengths and widths can be designed.) The PADDI's are to be used by tearing each of the PADDI's apart by the perforations 22, and wrapping them around the drill bit, with adhesive side adhering to the drill bit. (see FIG. 13) (This added feature of the "Perforated Adhesive Drill Depth Indicator" constructed as an integral part of the Disposable Drill Debris Eliminator is novelty G of this invention.)

Figure 13:
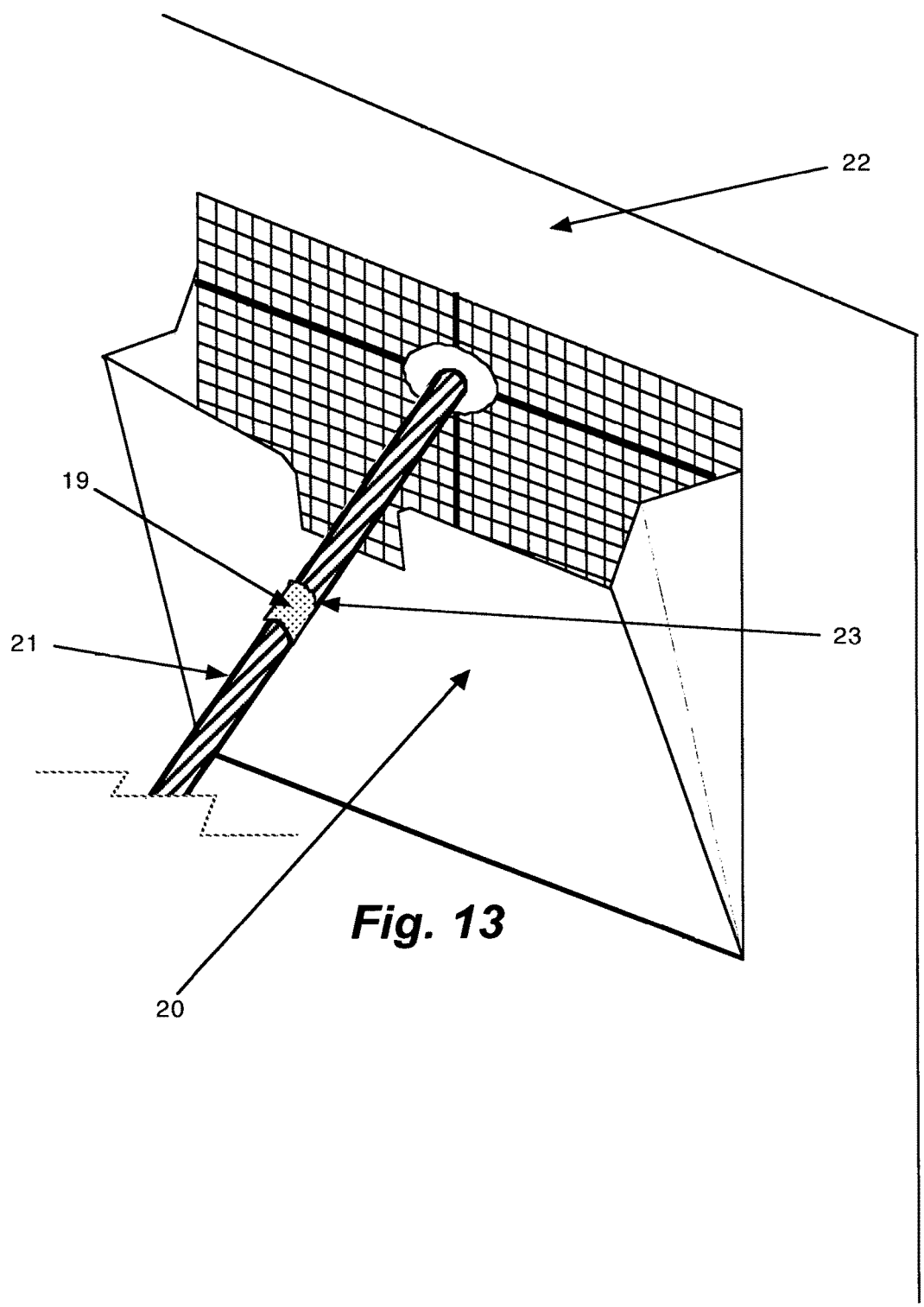
FIG. 13 is a perspective view of FIGS. 10, 11, and 12 depicting the "Perforated Adhesive Drill Depth Indicator", detached from the 'Disposable Drill Debris Eliminator' and positioned for use on the drill bit.

The last drawing, FIG. 13 depicts how the PADDI 19 is to be wrapped, adhered to, and positioned on the drill bit 21, to indicate the desired drill depth 23. After use and drilling is completed, the PADDI can easily be removed by unwrapping the PADDI from the drill bit 21 and discarded.

What is claimed is:

1. A system to drill a hole and collect, gather, and dispose of drill debris that is ejected from the drilling surface while drilling a hole into a vertical surface, comprising:
   a drill bit for drilling a hole;
   a flexible collector having an adhesive coated back panel, a front panel with an upper lip, the front and back panels being connected at respective bottom edges, a vertically folded left-side panel having a rear vertical edge connected to a left vertical edge of the back panel and a front vertical edge connected to a left vertical edge of the front panel, a vertically folded right-side panel having a rear vertical edge connected a right vertical edge of the back panel and a front vertical edge connected to a right vertical edge of the front panel, wherein these panels together form a body creating a cavity for collecting debris produced by the drill bit;
   the back panel having a hole for the drill bit to pass through while drilling a hole,
   the body being convertible from a substantially flat or closed configuration to an expanded or open configuration by unfolding the vertical folds on the left-side panel and the right-side panels, and the expanded body defining the cavity formed between the back panel and front panel, an entire front face of the back panel is cross-hatched with vertical and horizontal lines perpendicular to each other to aid in aligning the hole in the back panel with a location on the surface that is to be drilled;
   the adhesive coated back panel being covered by an adhesive sheet having perforation lines that divide the adhesive sheet into a plurality of strips of various widths and lengths, the individual strips being selectively torn away from the adhesive sheet and adhered to an axial location on the drill bit to serve as an indication of the desired depth of the hole to be drilled.

2. The system of claim 1, wherein the upper lip of the front panel is concave in shape.

3. The system of claim 1, wherein the flexible collector is made of one-piece construction.

* * * * *